United States Patent
Varunjikar et al.

(10) Patent No.: US 12,275,466 B2
(45) Date of Patent: Apr. 15, 2025

(54) PROVIDING ASSIST TORQUE IN STEERING SYSTEMS OPERATING WITHOUT A TORQUE SENSOR

(71) Applicant: STEERING SOLUTIONS IP HOLDING CORPORATION, Saginaw, MI (US)

(72) Inventors: Tejas M. Varunjikar, Troy, MI (US); Anthony J. Champagne, Saginaw, MI (US); Michael S. Wyciechowski, Grand Blanc, MI (US); Rangarajan Ramanujam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 326 days.

(21) Appl. No.: 16/389,222

(22) Filed: Apr. 19, 2019

(65) Prior Publication Data
US 2020/0331520 A1    Oct. 22, 2020

(51) Int. Cl.
*B62D 5/04*    (2006.01)
*B60W 40/103*    (2012.01)
(Continued)

(52) U.S. Cl.
CPC ......... *B62D 5/0463* (2013.01); *B60W 40/103* (2013.01); *B60W 50/00* (2013.01);
(Continued)

(58) Field of Classification Search
CPC ........ B62D 5/0463; B62D 5/049; B62D 6/00; B62D 5/0484; G07C 5/0808;
(Continued)

(56) References Cited

U.S. PATENT DOCUMENTS

| | | | |
|---|---|---|---|
| 2004/0107032 A1* | 6/2004 | Farrelly | B62D 6/04 701/42 |
| 2005/0189161 A1* | 9/2005 | Zheng | B62D 6/003 180/402 |

(Continued)

FOREIGN PATENT DOCUMENTS

| | | |
|---|---|---|
| CN | 104129425 A | 11/2014 |
| CN | 106004994 A | 10/2016 |

(Continued)

OTHER PUBLICATIONS

Y.-H. J. Hsu, S. M. Laws and J. C. Gerdes, "Estimation of Tire Slip Angle and Friction Limits Using Steering Torque," in IEEE Transactions on Control Systems Technology, vol. 18, No. 4, pp. 896-907, Jul. 2010, doi: 10.1109/TCST.2009.2031099. (Year: 2010).*

(Continued)

*Primary Examiner* — Harry Y Oh
*Assistant Examiner* — Danielle M Jackson
(74) *Attorney, Agent, or Firm* — Dickinson Wright PLLC (57) ABSTRACT

Technical solutions described herein include a method of controlling an electric power steering system includes determining that one or more hand wheel torque sensors of electric power steering system are not operational and in response generating an assist torque command by estimating a front slip angle based on a motor angle of a motor of the electric power steering system and a vehicle speed. The method also includes converting the front slip angle to a rack force. The method also includes determining an amount of assist torque based on the rack force and controlling the electric power steering system using the generated assist torque command.

14 Claims, 6 Drawing Sheets

(51) Int. Cl.
  *B60W 50/00*    (2006.01)
  *B62D 6/00*    (2006.01)
  *G07C 5/08*    (2006.01)
(52) U.S. Cl.
  CPC ............... *B62D 5/049* (2013.01); *B62D 6/00* (2013.01); *G07C 5/0808* (2013.01); *B60W 2050/0031* (2013.01); *B60W 2510/20* (2013.01); *B60W 2520/10* (2013.01); *B60W 2520/12* (2013.01); *B60W 2520/14* (2013.01); *B60W 2552/40* (2020.02)
(58) Field of Classification Search
  CPC ............... B60W 40/103; B60W 50/00; B60W 2552/40; B60W 2520/12; B60W 2510/20; B60W 2520/10; B60W 2050/0031; B60W 2520/14
  See application file for complete search history.

(56) References Cited

U.S. PATENT DOCUMENTS

| | | | |
|---|---|---|---|
| 2008/0208406 | A1 | 8/2008 | Chen et al. |
| 2009/0271074 | A1* | 10/2009 | Hulten .................. B62D 6/008 701/42 |
| 2010/0077847 | A1* | 4/2010 | Joe ....................... G01M 17/02 73/146 |
| 2014/0324294 | A1* | 10/2014 | Champagne .......... B62D 6/001 701/41 |
| 2016/0101809 | A1* | 4/2016 | Hong .................. B62D 5/0463 701/43 |
| 2016/0280251 | A1* | 9/2016 | George .................. B62D 6/006 |
| 2016/0288825 | A1* | 10/2016 | Varunjikar ........... B62D 5/0463 |
| 2017/0232998 | A1* | 8/2017 | Ramanujam ........... B62D 6/003 701/42 |
| 2018/0106714 | A1* | 4/2018 | Skold ..................... G01N 19/02 |
| 2019/0126711 | A1* | 5/2019 | Giovanardi ........... B60T 8/1755 |
| 2019/0185053 | A1* | 6/2019 | Wuthishuwong ...... G05B 17/02 |
| 2019/0389509 | A1* | 12/2019 | Kim ........................ B62D 6/00 |
| 2020/0017139 | A1* | 1/2020 | Ramanujam ........... B62D 6/008 |
| 2020/0216085 | A1* | 7/2020 | Bobier-Tiu ........... B60W 40/08 |

FOREIGN PATENT DOCUMENTS

| | | |
|---|---|---|
| CN | 107499373 A | 12/2017 |
| DE | 102012204870 A1 | 10/2012 |
| DE | 102017108692 A1 | 10/2017 |
| DE | 102017112968 A1 | 12/2017 |
| DE | 102019118831 A1 | 1/2020 |

OTHER PUBLICATIONS

German Examination Request with English translation for German Application No. 10 2020 110 472.3 mailed Mar. 1, 2022, 14 pages.
First Chinese Office Action and Search Report for Chinese Application No. 2020103113882 mailed Jan. 29, 2022, 10 pages.
Second Chinese Office Action and Search Report issued by The China National Intellectual Property Administration on Jun. 24, 2022 for related Chinese Patent Application No. 202010311388.2, 10 pages.

* cited by examiner

PROVIDING ASSIST TORQUE IN STEERING SYSTEMS OPERATING WITHOUT A TORQUE SENSOR

BACKGROUND

In a typical electric power steering (EP S) system of a vehicle, a hand wheel torque sensor is used to determine the driver requested assist torque. When the hand wheel torque sensor becomes un-enabled and does not function properly, the EPS system may not be able to provide the steering assist torque. Some methods provide loss of assist detection for rolling vehicle speeds.

SUMMARY

According to one or more embodiments, a method of controlling an electric power steering system includes determining that one or more hand wheel torque sensors of electric power steering system are not operational and in response generating an assist torque command by estimating a front slip angle based on a motor angle of a motor of the electric power steering system and a vehicle speed. The method also includes converting the front slip angle to a rack force. The method also includes determining an amount of assist torque based on the rack force and controlling the electric power steering system using the generated assist torque command.

According to one or more embodiments, an electric power steering system includes one or more hand wheel torque sensors. The electric power steering system also includes a motor and a controller that generates an assist torque command for generating assist torque using the motor. Generating the assist torque command includes performing a method that includes determining that one or more hand wheel torque sensors of electric power steering system are not operational and in response generating an assist torque command by estimating a front slip angle based on a motor angle of a motor of the electric power steering system and a vehicle speed. The method also includes converting the front slip angle to a rack force. The method also includes determining an amount of assist torque based on the rack force and controlling the electric power steering system using the generated assist torque command.

According to one or more embodiments a computer program product includes a memory device that has one or more computer executable instructions stored thereon, the computer executable instructions when executed by a processor cause the processor to perform a method for generating an assist torque command. The method includes determining that one or more hand wheel torque sensors of electric power steering system are not operational and in response generating an assist torque command by estimating a front slip angle based on a motor angle of a motor of the electric power steering system and a vehicle speed. The method also includes converting the front slip angle to a rack force. The method also includes determining an amount of assist torque based on the rack force and controlling the electric power steering system using the generated assist torque command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
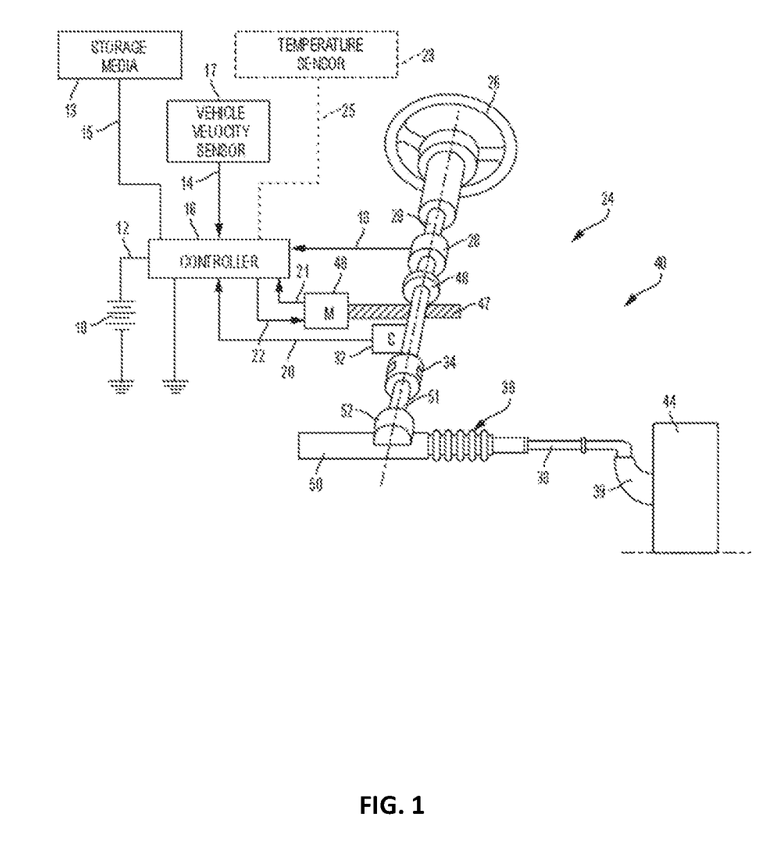
FIG. 1 depicts an EPS system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) or tire(s) 44 (only one shown).

Electric power steering assist is provided through the control apparatus generally designated by reference numeral 24 and includes the controller 16 and an electric machine 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where Δt is the sampling time and Δθ is the change in position during the sampling interval. Alternatively, motor velocity may be derived from motor position as the time rate of change of position. It will be appreciated that there are numerous well-known methodologies for performing the function of a derivative.

As the hand wheel 26 is turned, torque sensor 28 senses the torque applied to the hand wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

In one or more examples, the technical solutions described herein facilitate generating assist torque when an input torque sensor is unable to function. It should be noted that although the technical solutions are described herein using embodiments of steering system, the technical solutions are applicable to any other motor control system that is used in any other application that generates an assist torque based on measuring an input torque from an operator, for example, a biomechanical assist device, and the like.

As described herein, a technical challenge with a system such as the EPS 12 that use the torque sensor 28 to determine the operator requested assist is that if/when the functionality of the torque sensor 28 encounters an error/failure, the system is not be able to provide assist torque, referred to as a loss of assist condition. In an EPS 12, for example, such loss of assist condition can have an increased sensitivity because the operator may rely on the assist torque for maneuvering the vehicle. Various solutions exist to reduce the loss of assist occurrences. Further, the existing solutions rely on a steady-state vehicle model to predict lateral acceleration and using the predicted lateral acceleration to calculate the amount of assist torque to generate. However, such solutions can be conservative, because they can limit the amount of assist torque for various dynamic steering inputs due to the use of a steady-state state model as the vehicle model. For example, lateral acceleration error scales down the assist torque that is generated. Further yet, the existing solutions use a lateral acceleration for determining the amount of assist torque, however, the actual rack load may not be directly proportional to lateral acceleration, and hence, the amount of assist torque may not be closely related to the rack load in such cases.

The technical solutions described herein address such technical challenge by utilizing a nonlinear vehicle dynamics model to provide an improved level of assist torque and vehicle signals to robustly detect dynamic deviations to modify the assist torque to be generated.

The technical solutions described herein accordingly facilitate generating an assist torque when the torque sensor 28 encounters a failure condition and is unable to provide an input torque measurement. It should be noted that in other cases the failure condition may be with any other component that prevents the use of the input torque signal 18 to determine the amount of assist torque to be generated. The technical solutions described herein accordingly address the technical challenges described above.

Figure 2:
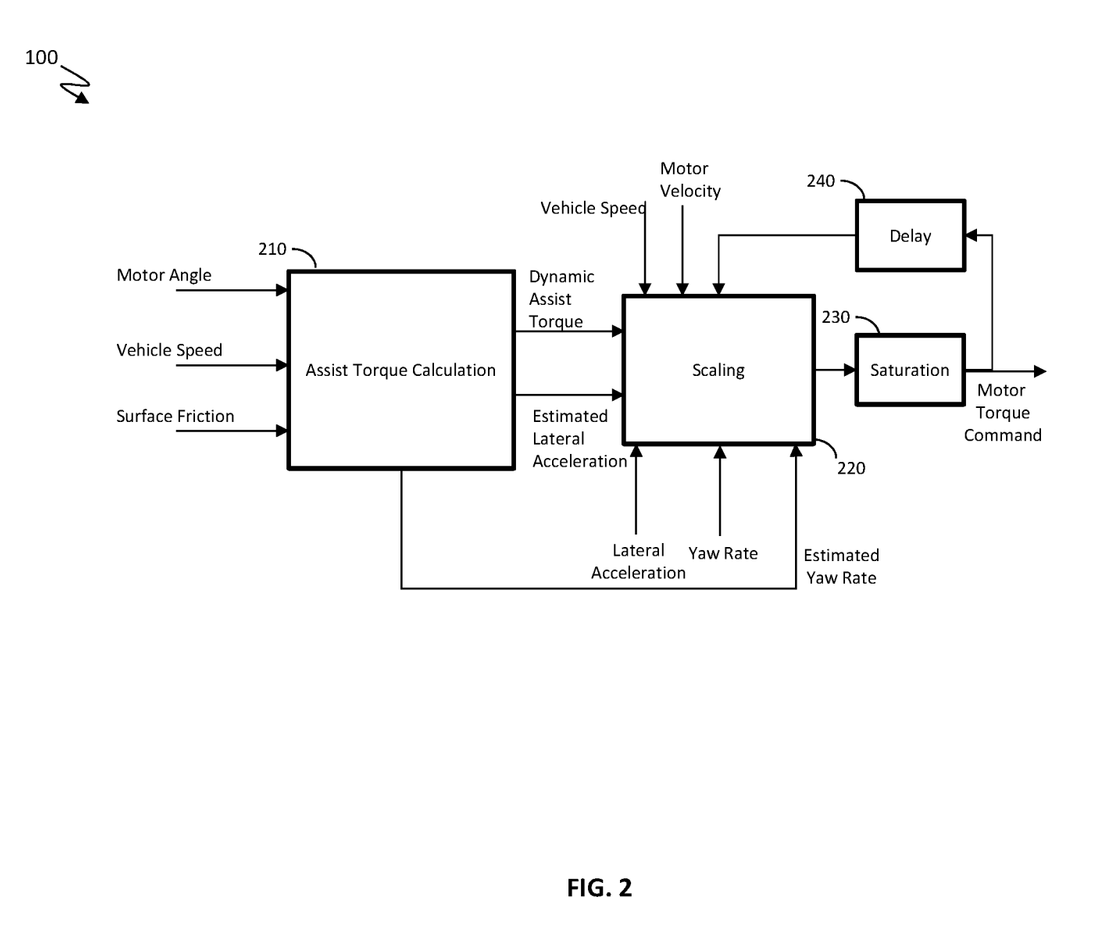
FIG. 2 depicts a block diagram of a system for a dynamic vehicle model to provide assist in an EPS without a torque sensor according to one or more embodiments.

FIG. 2 depicts a block diagram of a system 100 for a dynamic vehicle model to provide assist in an EPS without a torque sensor according to one or more embodiments. As used herein, "provide assist" includes generating an assist torque for the operator. Generating the assist torque includes determining the amount of assist torque to be generated, and applying a corresponding torque command by the controller 16 to generate the amount of torque by the motor 46. The one or more modules depicted is one example implementation. It is understood that in other examples, the one or more modules may be combined or split into different modules. In one or more examples, the modules can include memory devices that have stored thereon one or more computer executable instructions that are executed by one or more processors, such as the controller 16.

The system 100 includes, among other components, an assist torque calculation module 210, a scaling module 220, a saturation module 230, and a delay module 240.

The assist torque calculation module 210 uses a dynamic model of the vehicle rack force to calculate the amount of assist to be provided based on a feedforward steering angle input. The steering angle can be based on a position of the hand wheel 26 and/or an angle of the motor 46. The assist torque calculation module 210 further receives a vehicle speed and a surface friction ($\mu$) as input. The vehicle speed is the speed at which the vehicle is traveling, and the surface friction is a coefficient of friction of the surface on which the vehicle is traveling. The surface friction can be estimated by the controller 16 in one or more examples. Furthermore, a nominal surface friction value may be used if such value is not estimated by EPS or other modules.

Figure 3:
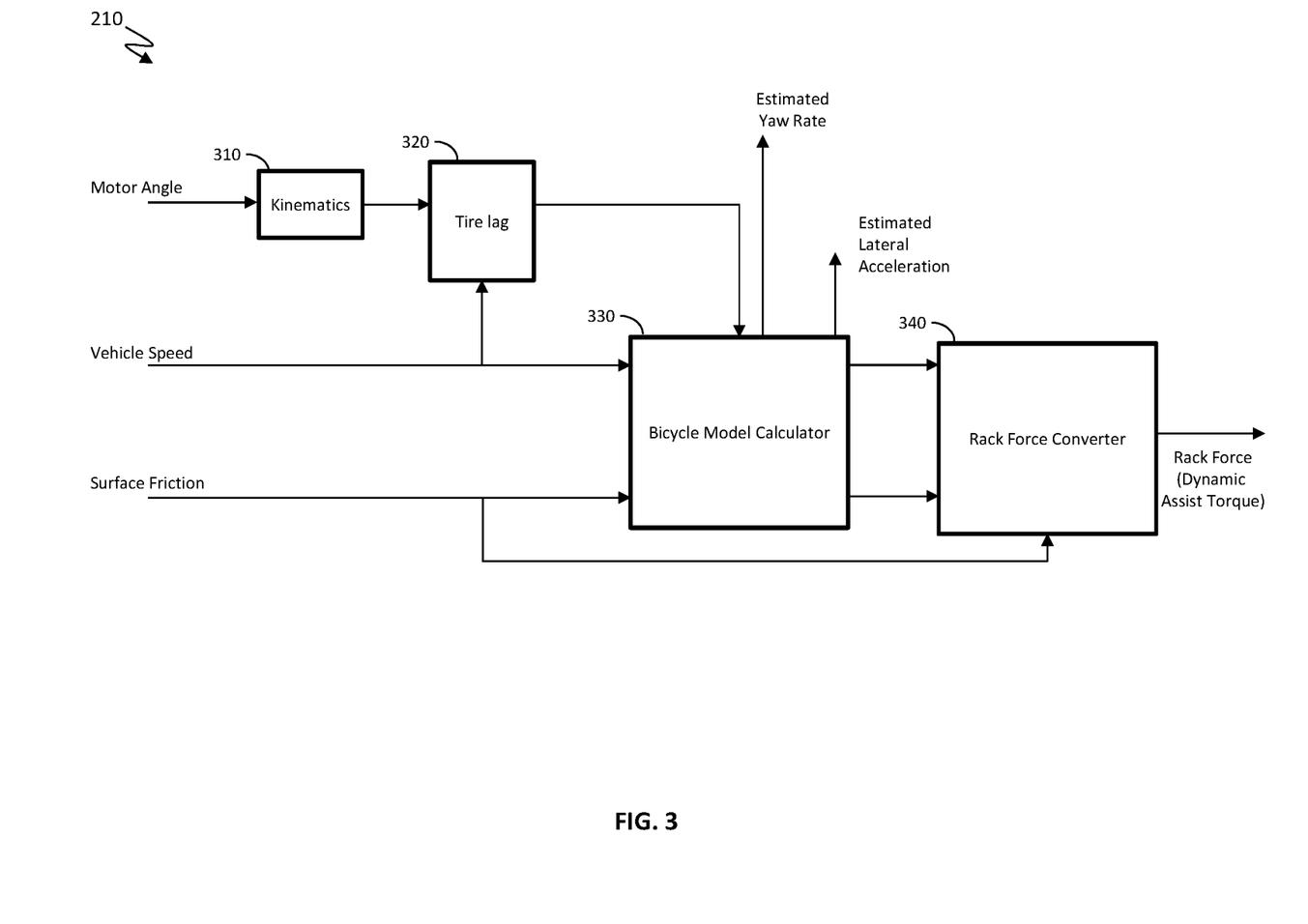
FIG. 3 depicts a block diagram for operation of the assist torque calculation module according to one or more embodiments.

FIG. 3 depicts a block diagram for operation of the assist torque calculation module according to one or more embodiments. A kinematics module 310 converts the motor angle to a tire angle. The kinematics module 310, in one or more examples, uses look up tables, which are populated using data collected on a tire alignment stand. Other techniques can also be used for converting the motor angle to tire angle, for example, a dynamic computation. Further, a tire lag module 320 uses the tire angle, along with the vehicle speed to output a lagged tire angle variable ($\delta_{lagged}$), which represents the first order dynamics of the tire using tire relaxation length. The tire lag module 320, in one or more examples, applies a vehicle speed dependent low pass filter to tire angle for computing the $\delta_{lagged}$ value.

Further, a bicycle model calculator 330 uses equations of the bicycle model to compute front axle lateral force ($F_{cf}$) and front slip angle, ($\alpha_f$). For example, the equations used by the bicycle model calculator 330 include—

$I_{zz}\dot{r} = a \cdot F_{cf} - b \cdot F_{cr}$; and     Yaw Dynamics Equation:

$m(\dot{V} + rU) = F_{cf} + F_{cr}$.     Lateral Dynamics Equation:

The slip angles can be computed using following equations:

$$\alpha_f = \frac{V + a.r}{U} - \delta_{lagged}$$

$$\alpha_r = \frac{V - b.r}{U}$$

In the above equations, $I_{zz}$ is a rotational inertia, r is yaw rate, a is center of gravity (CG) to front axle distance, b is CG to rear axle distance, V is lateral velocity at CG, U is longitudinal velocity at CG, $F_{cf}$ is front axle lateral force, and $F_{cr}$ is rear axle lateral force, $\alpha_r$ is rear slip angle and m is vehicle mass. Furthermore, the term ($\dot{V}+rU$) in the left-hand side of lateral dynamics equation represents lateral acceleration, $a_y$, of the vehicle.

Typically, the lateral tire force equations are represented using a linear tire model, but because it represents forces only in the linear region of tire force curve, the technical solutions described herein modify the bicycle model calculations by using a nonlinear tire model that is a function of the surface friction. An empirical or physics-based model can used to represent front and rear tire dynamics. For example, typical known models include the Fiala tire model and the Magic tire model. The Fiala tire model is represented below.

$$F_y = \begin{cases} -C_\alpha \tan\alpha + \frac{C_\alpha^2}{3}|\tan\alpha|\tan\alpha I_f - \frac{C_\alpha^3}{27}\tan^3\alpha I_f^2 & \text{if } |\alpha| \le \alpha_{sl} \\ -\frac{1}{I_f}\text{sgn}\,\alpha & \text{else} \end{cases}$$

$$\alpha_{sl} = \tan^{-1}\left(\frac{3}{C_\alpha I_f}\right)$$

$I_f = \mu * \text{vertical load of axle}$

In the above equations of the Fiala tire model, $F_y$ is tire lateral force, $C_\alpha$ is a cornering stiffness parameter, $\alpha$ is a tire slip angle, $I_f$ is inverse of maximum lateral tire force, which is a function of $\mu$, and $\alpha_{sl}$ is a sliding slip angle. It should be noted that this equation is valid for both front axle or tire lateral force calculation as well as rear axle or tire lateral force calculation. For instance, for the front axle lateral force calculation, the front slip angle, $\alpha_f$, and vertical load on front axle will be used. In one or more examples, the bicycle model calculator 330 includes one or more digital electronic circuits for the above calculations, such as multiplier(s), digital integrator(s), divider(s), adder(s), subtractor(s), and the like.

The output of the bicycle model calculator is converted into a rack force value by a rack force converter 340. A nonlinear or linear table or equation can be used to convert estimated rack force to a dynamic assist torque. This determines how much help (i.e. assist) the EPS motor 19 provides to the driver, for various rack loads. Accordingly, the rack force is computed using the front slip angle ($\alpha_f$), for example, by computing the front axle lateral force from the front slip angle. The front slip angle is estimated based on the motor angle and the vehicle speed.

Figure 4:
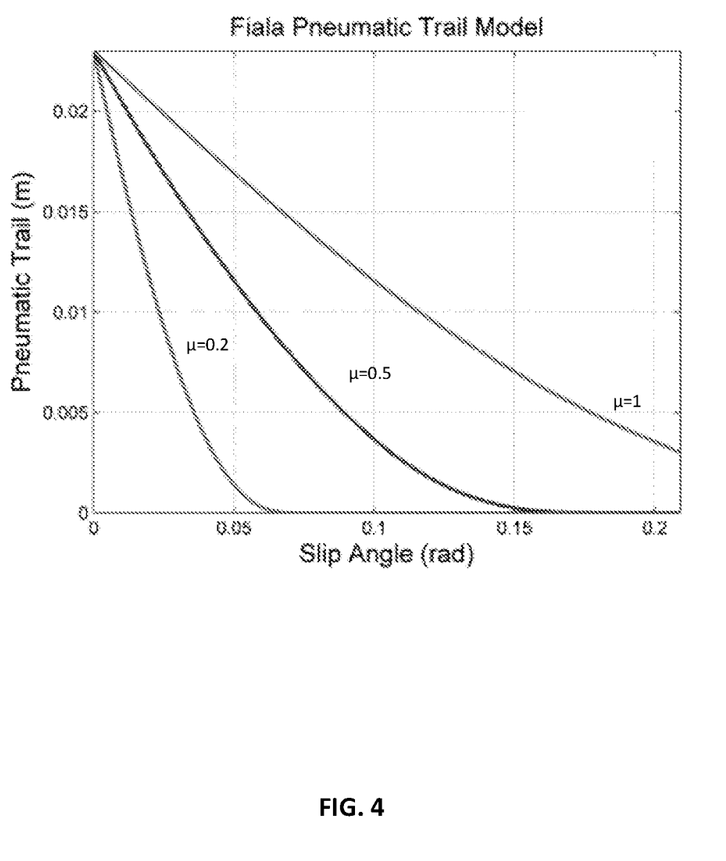
FIG. 4 depicts an example pneumatic trail model according to one or more embodiments.

The rack force converter is an addition, compared to typical lateral dynamics model, to convert the tire lateral force computed by the bicycle model to rack force. In one or more examples, the rack force is computed as the multiplication of front axle lateral force ($F_{cf}$) and a pneumatic trail value. Pneumatic trail is the distance between geometric center of tire contact patch and resultant force due to side-slip. The technical solutions described herein use a pneumatic trail model that can be an empirical model or an equation-based model. FIG. 4 depicts an example pneumatic trail model where the pneumatic trail changes as a function of surface friction.

Accordingly, Fiala tire model equations for pneumatic tire model are shown below.

$$t_p = \begin{cases} t_{p0} \dfrac{1 - 3|\theta_y \sigma_y| + 3(\theta_y \sigma_y)^2 - |\theta_y \sigma_y|^3}{1 - |\theta_y \sigma_y| + \dfrac{1}{3}(\theta_y \sigma_y)^2} & \text{if } |\alpha| \leq \alpha_{sl} \\ 0 & \text{else} \end{cases}$$

where, $\sigma_y = \tan \alpha$; and $$\theta_y = \frac{C_\alpha l_f}{3}$$

Here, $t_p$ is the pneumatic trail and the $\sigma_y$ and $\theta_y$ are intermediate variables used to simplify the expressions. The rack force obtained from nonlinear bicycle model can be converted to a dynamic assist torque command using a nonlinear table similar to boost curve table or by other means, such as dynamic computation.

The assist torque calculation module 210 further computes an estimated lateral acceleration of the vehicle based on the motor angle and the vehicle speed. In one embodiment, the following lateral acceleration gain equation is used to compute the estimated lateral acceleration:

$$a_y = (\dot{V} + \dot{r}U)$$

It should be noted that any other technique can be used for computing the estimated lateral acceleration, and that the above is just one example.

The assist torque calculation module 210 outputs the assist torque command along with the estimated lateral acceleration value.

Figure 5:
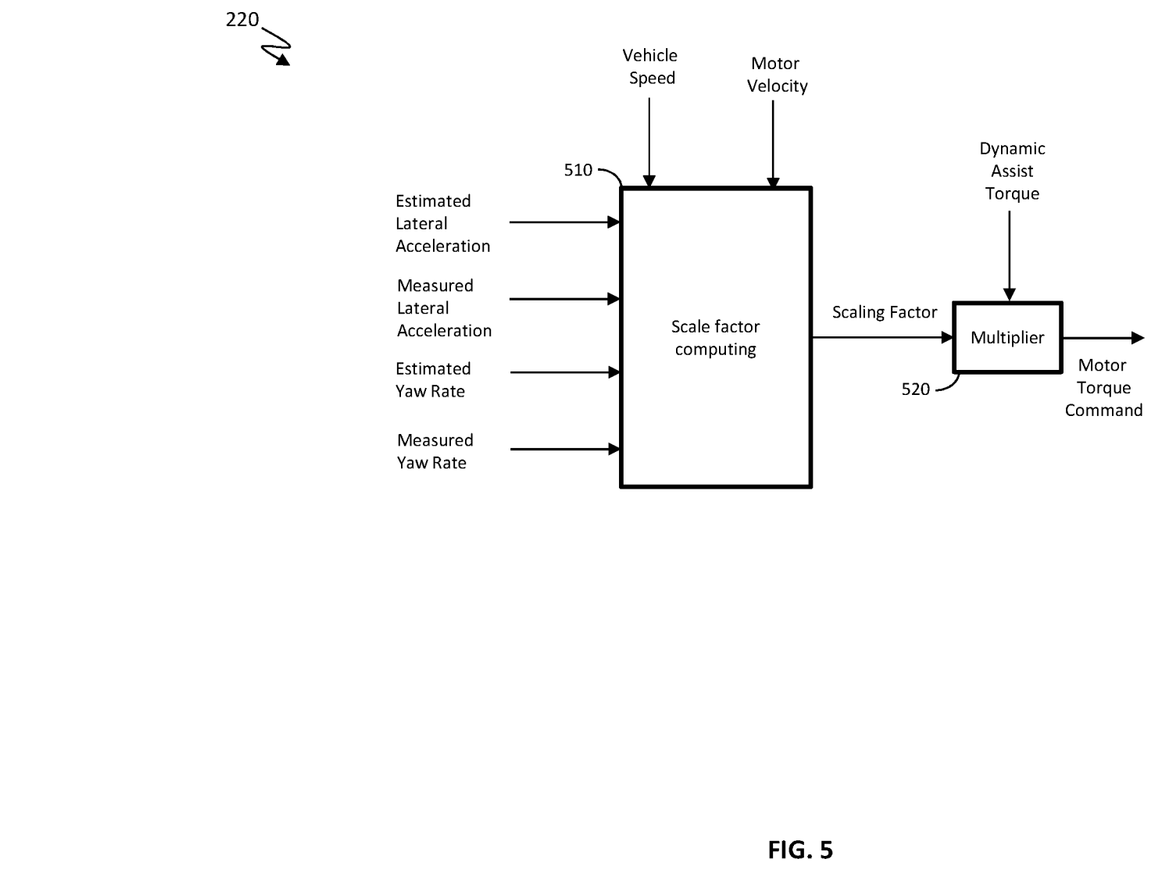
FIG. 5 depicts a block diagram of the scaling module according to one or more embodiments.

Referring back to FIG. 2, the output of the assist torque calculation module 210 is input to a scaling module 220. The scaling module 220 scales the assist torque command. FIG. 5 depicts a block diagram of the scaling module according to one or more embodiments. The scaling module includes a scale factor calculator 510 and a multiplier 520, among other components.

The scale factor calculator 510 computes a scaling factor based on a lateral acceleration error. In one or more embodiments, the scale factor calculator 510 determines whether the vehicle is operating outside nominal conditions such as in a low μ condition (i.e., the coefficient of friction of the surface on which the vehicle is operating is below a threshold value—e.g., icy road). The scale factor calculator 510 computes a difference between the estimated lateral acceleration and a measured lateral acceleration. The measured lateral acceleration is measured by a lateral acceleration sensor (not shown) of the vehicle. Depending on the difference between the estimated and measured lateral acceleration, the scale factor calculator 510 determines that the vehicle is operating in a low μ condition and scales up/down the assist torque command to generate a final motor torque command.

The scale factor calculator 510 uses several different threshold values to scale the assist torque command to generate the final motor torque command. In one or more examples, the scale factor calculator 510 uses a high threshold and a low threshold. When the difference exceeds the high threshold, the scale factor calculator 510 scales the assist torque command down to no assist (i.e., zero assist torque). That is, no assist torque is commanded when the vehicle is operating in a very low μ condition. When the difference does not exceed the high threshold but exceeds the low threshold, the scale factor calculator 510 reduces the assist torque command. In one example, the scale factor calculator 510 computes a scaling factor that scales the assist torque command down to approximately 50% of the assist torque command. As another example, the scale factor calculator 510 limits the assist torque command to a maximum unintended assist torque value (predetermined value, e.g., 5-7 Nm (newton meter) at the pinion). When the difference does not exceed the low threshold, the scale factor calculator 510 does not scale down the assist torque command and sets the final torque command to a full assist torque command (predetermined value).

The scale factor calculator 510 in this example uses two thresholds. However, as can be appreciated, more than two threshold values or a single threshold value or other equivalent approaches may be used to scale the assist torque command in other examples.

In addition to the lateral acceleration based scaling described above, according to the technical solutions described herein, the scale factor calculator 510 further performs a scaling based on yaw rate error. Yaw rate error is computed as the difference between an estimated yaw rate from a dynamic bicycle model and the measured yaw rate.

As described herein, the motor torque command is computed from an angle-based rack force prediction by the dynamic bicycle model. This prediction may not be accurate at near-limit conditions where the actual rack force drops, and non-linear bicycle model is no longer valid. Hence, to provide accurate assist torque under such near-limit conditions, the scaling based on yaw rate error is used in conjunction with the lateral acceleration difference. The yaw rate based scaling provides information to scale down the level of the assist torque command under these conditions when generating the final motor torque command. For example, an error term is computed as error=abs(estimated yaw rate−measured yaw rate). The error term is used to access a look up table or used as an input to a dynamic equation to compute a scaling factor. As the error increases, the scaling goes down to zero from 1.

In one or more examples, the lateral acceleration based scaling factor is adjusted based on the difference in the estimated yaw rate and the measured yaw rate, and the assist torque command is multiplied with the scaling factor. Alternatively, or in addition, a separate scaling factor based on the difference in the measured and estimated yaw rates is computed, and the assist torque command is multiplied with both, the lateral acceleration based scaling factor and the yaw rate based scaling factor.

Referring now to FIG. 2, the output of the scaling module 220 is passed through a saturation module 230 to limit the assist torque command value to a predetermined maximum. Further, in one or more examples, a delay module 240, such as a unit delay, provides previous value (for example, from time t−1, t−2, . . . ) of the motor torque command into the scaling module 220 for computing a present value (at time t) of the motor torque command.

Figure 6:
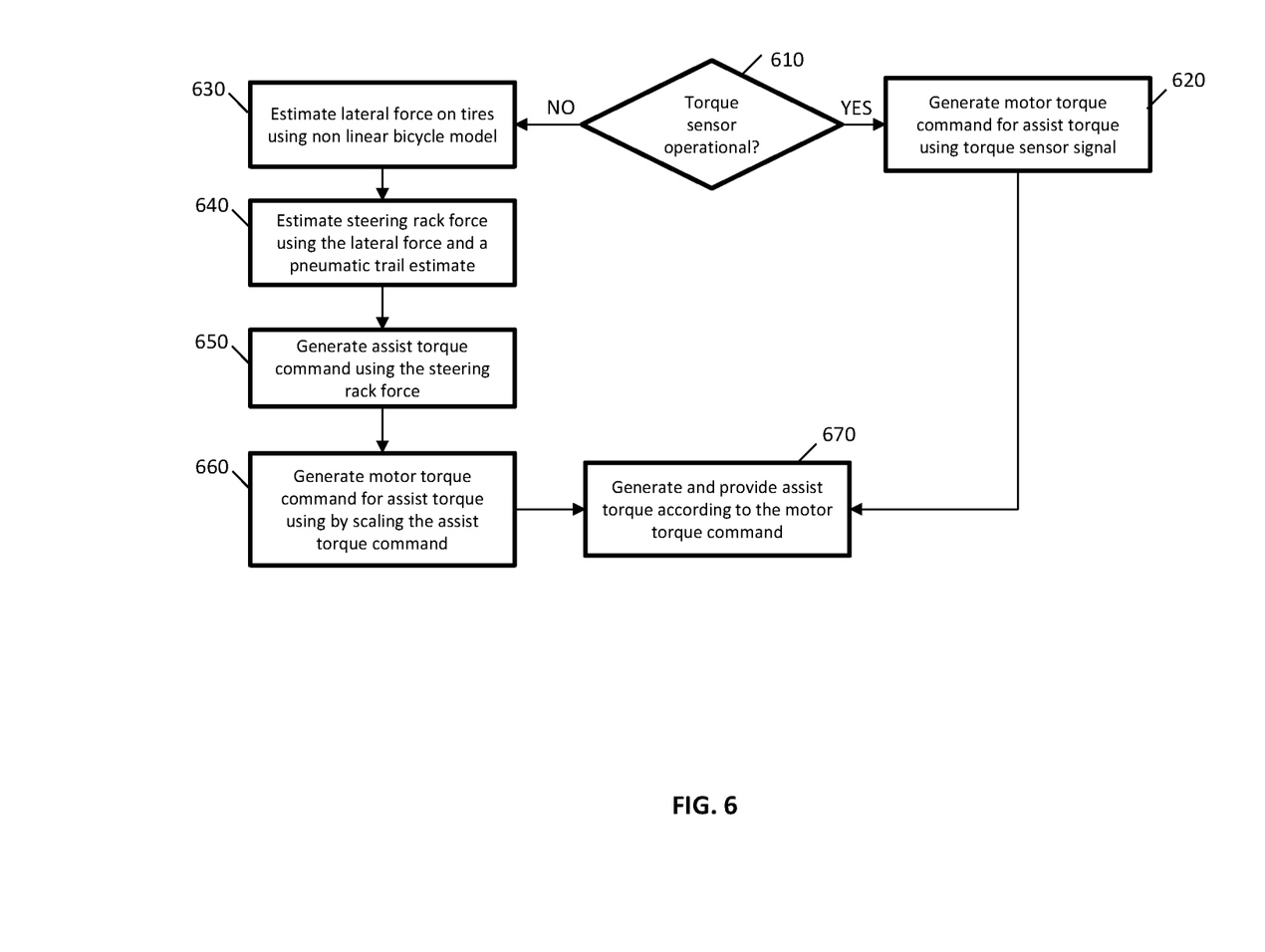
FIG. 6 depicts a flowchart of an example method for generating motor torque command using a bicycle model with nonlinear tire mode when a torque sensor fails according to one or more embodiments.

FIG. 6 depicts a flowchart of an example method for generating motor torque command using a bicycle model with nonlinear tire model when a torque sensor fails according to one or more embodiments. As can be appreciated in light of the present disclosure, the order of operation within the method is not limited to the sequential execution as illustrated in FIG. 6, but may be performed in one or more varying orders as applicable and in accordance with the present disclosure. In various embodiments, the method can be scheduled to run based on predetermined events, and/or run continually during operation of the vehicle. The method includes determining if the torque sensor 28 is operational and if the input torque from the operator can be measured, at 610. If the torque sensor 28 is operational, the method includes generating a motor torque command to provide corresponding assist, at 620. The motor torque command is used to generate the corresponding amount of torque using the motor 46 to assist the operator to maneuver the vehicle, at 670.

When the torque sensor 28 is not operational, and/or the input torque from the operator is not measurable (610), the method includes estimating a front axle lateral force on the tires 44 using a non-linear bicycle model, which is a modified bicycle model as described herein, at 630. The front axle lateral force is used to estimate a lateral acceleration of the vehicle. Further, the method includes estimating a steering rack force using the front axle lateral force and a pneumatic trail estimate, at 640. The steering rack force is used to compute an assist torque, at 650. For example, the assist torque results in a force that is opposite and equal to the steering rack force.

Further, the method includes scaling the assist torque for generating a motor torque command, at 660. The scaling is performed based on the lateral acceleration as well as a yaw rate. The motor torque command is used to generate the corresponding amount of torque using the motor 46 to assist the operator to maneuver the vehicle, at 670.

Accordingly, the technical solutions described herein provide a dynamic bicycle model that generates rack force signal for assist command generation, where the bicycle model uses a nonlinear tire model. Dynamic bicycle model that generates rack force signal for assist command generation is used to calculate slip angles and front axle lateral force. Subsequently, a pneumatic trail model is used to convert the front axle lateral force to rack force. The pneumatic trail module facilitates computing the rack force from the front axle lateral force as a function of a predicted road friction coefficient (μ).

Further, the technical solutions described herein facilitate using a dynamic model for generating a motor torque command and scaling the motor torque command based on lateral acceleration or yaw rate or both. Further yet, the technical solutions described herein facilitate another dynamic model that is based on yaw rate for scaling the motor torque command, in addition to or alternatively to the scaling based on the lateral acceleration. Such scaling reduces the assist force that is generated based on the rack force.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A method of controlling an electric power steering system, the method comprising:
   determining that one or more hand wheel torque sensors of an electric power steering system are not operational;
   in response, generating an assist torque command, the generating comprises:
      estimating, using a bicycle model modified using a nonlinear tire model, a front slip angle based on a motor angle of a motor of the electric power steering system and a vehicle speed, wherein the bicycle model includes a dynamic bicycle model and wherein the nonlinear tire model is a function of surface friction, tire lateral force, a cornering stiffness parameter, and an inverse of a maximum lateral tire force, wherein the inverse of the maximum lateral tire force is determined based on a product of the surface friction and a vehicle load of at least one axle associated with the electric power steering system;
      computing, using the bicycle model modified using the nonlinear tire model, a front axle lateral force using the front slip angle;
      converting the front axle lateral force to the rack force using a product of the front axle lateral force and a pneumatic trail value associated with a pneumatic trail model comprising one of an empirical model and an equation-based model;
      determining an amount of assist torque based on the rack force;
      determining an estimated lateral acceleration based on the motor angle and the vehicle speed;
      determining a lateral acceleration error based on the estimated lateral acceleration and a measured lateral acceleration;
      in response to the lateral acceleration error exceeding a first threshold, setting the assist torque to 0; and
      in response to the lateral acceleration error exceeding a second threshold:
         estimating a yaw rate using the bicycle model modified using the nonlinear tire model;
         receiving a measured yaw rate;
         determining a yaw rate error based on a difference between the estimated yaw rate and the measured yaw rate; and
         scaling down the assist torque based at least on the yaw rate error and the lateral acceleration error; and
   controlling the electric power steering system using the generated assist torque command.

2. The method of claim 1, wherein estimating the front axle lateral force further comprises computing a tire lag based on the motor angle and the vehicle speed.

3. The method of claim 1, wherein converting the front axle lateral force to the rack force comprises:
   estimating the pneumatic trail using the front slip angle and a surface friction coefficient.

4. The method of claim 1, wherein generating the assist torque command further comprises:
   generating an assist torque command corresponding to the amount of assist torque.

5. The method of claim 1, wherein generating the assist torque command further comprises:
   generating an assist torque command corresponding to the amount of assist torque.

6. An electric power steering system comprising:
   one or more hand wheel torque sensors;
   a motor; and
   a controller that generates an assist torque command for generating assist torque using the motor, generating the assist torque command comprises:
      determining that one or more hand wheel torque sensors of electric power steering system are not operational;
      estimating, using a bicycle model modified using a nonlinear tire model, a front slip angle based on a motor angle of a motor of the electric power steering system and a vehicle speed, wherein the bicycle model includes a dynamic bicycle model and wherein the nonlinear tire model is a function of surface friction, tire lateral force, a cornering stiffness parameter, and an inverse of a maximum lateral tire force, wherein the inverse of the maximum lateral tire force is determined based on a product of the surface friction and a vehicle load of at least one axle associated with the electric power steering system; and
      computing, using the bicycle model modified using the nonlinear tire model, a front axle lateral force using the front slip angle;
      converting the front axle lateral force to the rack force using a product of the front axle lateral force and a pneumatic trail value associated with a pneumatic trail model comprising one of an empirical model and an equation-based model;
      determining an amount of assist torque based on the rack force;
      determining an estimated lateral acceleration based on the motor angle and the vehicle speed;
      determining a lateral acceleration error based on the estimated lateral acceleration and a measured lateral acceleration;
      in response to the lateral acceleration error exceeding a first threshold, setting the assist torque to 0;
      in response to the lateral acceleration error exceeding a second threshold:
         estimating a yaw rate using the bicycle model modified using the nonlinear tire model;
         receiving a measured yaw rate;
         determining a yaw rate error based on a difference between the estimated yaw rate and the measured yaw rate; and
         scaling down the assist torque based at least on the yaw rate error the lateral acceleration error; and
      controlling the electric power steering system using the generated assist torque command.

7. The electric power steering system of claim 6, wherein estimating the front axle lateral force further comprises computing a tire lag based on the motor angle and the vehicle speed.

8. The electric power steering system of claim 6, wherein converting the front axle lateral force to the rack force comprises:
   estimating the pneumatic trail using the front slip angle and a surface friction coefficient.

9. The electric power steering system of claim 6, wherein generating the assist torque command further comprises:
   generating an assist torque command corresponding to the amount of assist torque.

10. The electric power steering system of claim 6, wherein generating the assist torque command further comprises:
    generating an assist torque command corresponding to the amount of assist torque.

11. A computer program product comprising a memory device that has one or more computer executable instructions stored thereon, the computer executable instructions when executed by a processor cause the processor to perform a method for generating an assist torque command, the method comprising:
   determining that one or more hand wheel torque sensors of an electric power steering system are not operational;
   estimating, using a bicycle model modified using a nonlinear tire model, a front slip angle based on a motor angle of a motor of the electric power steering system and a vehicle speed, wherein the bicycle model includes a dynamic bicycle model and wherein the nonlinear tire model is a function of surface friction, tire lateral force, a cornering stiffness parameter, and an inverse of a maximum lateral tire force, wherein the inverse of the maximum lateral tire force is determined based on a product of the surface friction and a vehicle load of at least one axle associated with the electric power steering system;
   computing, using the bicycle model modified using the nonlinear tire model, a front axle lateral force using the front slip angle;
   converting the front axle lateral force to the rack force using a product of the front axle lateral force and a pneumatic trail value associated with a pneumatic trail model comprising one of an empirical model and an equation-based model;
   determining an amount of assist torque based on the rack force;
   determining an estimated lateral acceleration based on the motor angle and the vehicle speed;
   determining a lateral acceleration error based on the estimated lateral acceleration and a measured lateral acceleration;
   in response to the lateral acceleration error exceeding a first threshold, setting the assist torque to 0;
   in response to the lateral acceleration error exceeding a second threshold;
      estimating a yaw rate using the bicycle model modified using the nonlinear tire model;
      receiving a measured yaw rate;
      determining a yaw rate error based on a difference between the estimated yaw rate and the measured yaw rate; and
      scaling down the assist torque based on at least the yaw rate error the lateral acceleration error; and
   controlling the electric power steering system using the generated assist torque command.

12. The computer program product of claim 11, wherein converting the front axle lateral force to the rack force comprises:
   estimating the pneumatic trail using the front slip angle and a surface friction coefficient.

13. The computer program product of claim 11, wherein generating the assist torque command further comprises:
   generating an assist torque command corresponding to the amount of assist torque.

14. The computer program product of claim 11, wherein generating the assist torque command further comprises:
   generating an assist torque command corresponding to the amount of assist torque.

\* \* \* \* \*